B. D. HORTON.
ELECTRICAL SWITCH.
APPLICATION FILED MAR. 24, 1915.

1,308,423.

Patented July 1, 1919.

WITNESSES:
Arthur Choquet
Geo. A. Eberhardt

INVENTOR.
Bryson Dexter Horton.
BY
Clifford ...
ATTORNEY

UNITED STATES PATENT OFFICE.

BRYSON DEXTER HORTON, OF DETROIT, MICHIGAN.

ELECTRICAL SWITCH.

1,308,423.  Specification of Letters Patent.  Patented July 1, 1919.

Application filed March 24, 1915. Serial No. 16,610.

*To all whom it may concern:*

Be it known that I, BRYSON D. HORTON, a citizen of the United States, residing at Detroit, in the county of Wayne and State of Michigan, have invented certain new and useful Improvements in Electrical Switches, of which the following, taken in connection with the accompanying sheet of drawings, is a full, clear, and concise description.

My present invention relates to an electrical switch construction which is particularly well adapted to a grounded three wire system.

The switching devices ordinarily used in a three wire system are three pole, and are adapted for simultaneously opening the two outside wires and the neutral wire, thereby rendering entirely dead all of the system on the load side of the switch. This arrangement was designed early in the history of electrical distribution and was then particularly desirable as satisfactory balancing could be readily obtained. This balancing was two fold. First the load balancing of the two sides of the system whereby the greater proportion of the current was carried at the higher potential and a minimum current was carried by the neutral. The other and more serious sort of unbalancing resulted when there was a break in the neutral connection between the load and source, for in this case whatever load was between the positive outside wire and the neutral would be in series with the load which happened to be between the neutral and the negative outside wire, and whichever of these loads was the smaller would be subjected to an excessive portion of the total voltage.

At the present stage of development of electrical distribution, the early advantages of the three wire system have been found to be of less importance. The neutral has been grounded and in modern installations has continued to be grounded, but has assumed the same size, or current carrying capacity, as the outside wires. In such a system the presence of a switch in the neutral is not only entirely unnecessary but is detrimental. The neutral wire becomes a convenient ground for each side of the system, and what was the old three wire system now assumes the status of two two wire systems of approximately the same potential having a common grounded return.

It is, therefore, apparent that such a system may be controlled more satisfactorily by single pole switches, one on either side. Each side may be controlled entirely independent of the other, and when one switch is opened, that load side is entirely "dead", the other side being in no way affected.

It is, therefore, an object of my invention to provide switches and their appurtenances for use in such a system. I, however, desire to state distinctly that the switch may be used to advantage elsewhere and that I do not limit my invention to use in any particular system. The device, an embodiment of which is illustrated and described herein, is, I find, particularly well suited for the purpose. It is easy to manipulate; is free of complication to confuse the workman.

Other objects will make themselves manifest upon reading of the following specification, taken with the accompanying drawings, of an embodiment.

Referring to the accompanying drawings, in which like reference characters indicate like parts throughout the respective views, Figure 1 is a view in plan of a switch incorporating the features of my invention, the cover of the metal housing being removed.

Figure 1:
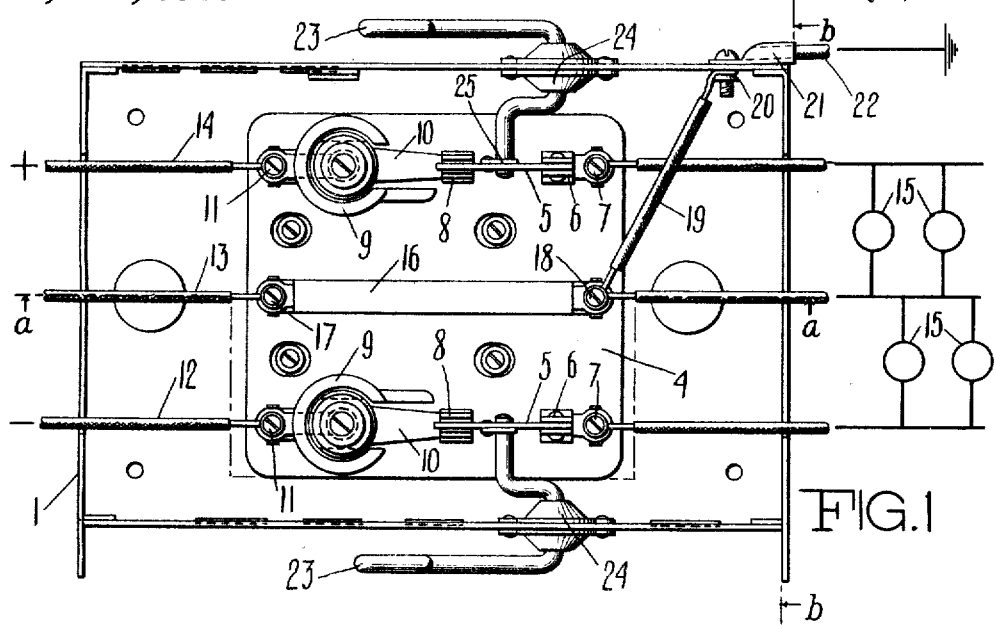
Figure 2:
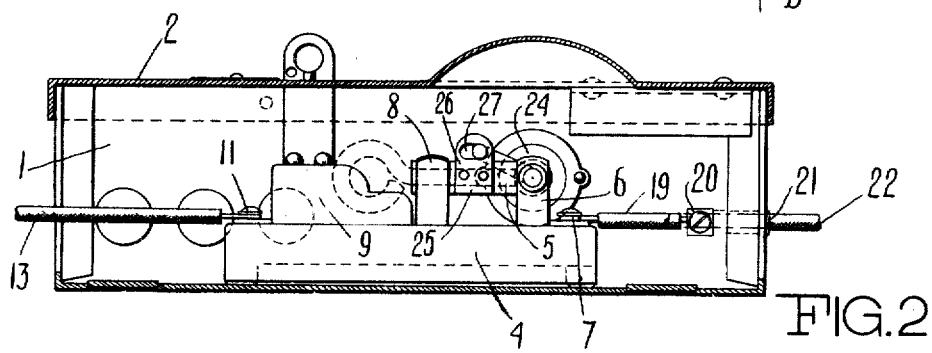
Fig. 2 is a view in vertical cross-section, taken on line *a—a* of Fig. 1.
Figure 3:
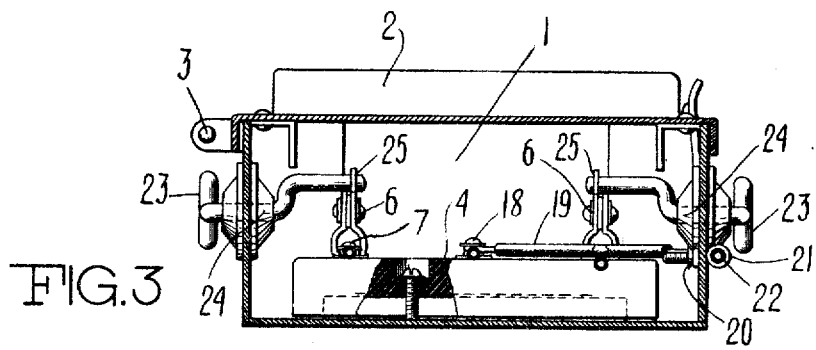
Fig. 3 is an end view taken on line *b—b* of Fig. 1, the wall of the casing being removed to show the interior mechanism.

The body of the metal housing is indicated by the numeral 1, this being provided with a cover 2, hinged thereto at 3.

Within the housing and fastened to the bottom thereof is an insulating base 4, upon which the movable and stationary contacts and fuse receptacles are mounted. The movable contacts 5 are of the knife-blade type and are pivotally mounted at one end to suitable supports 6, which, in turn, are in electrical connection with the binding posts or screws 7. The movable contacts 5 coöperate with the stationary contacts 8, which are in electrical connection with the fuse holders 9, through the metallic conductive strips 10, each of the latter being connected to one terminal of the fuse receptacles. The opposite terminals of the fuse receptacles are in electrical connection with the binding posts 11.

12, 13 and 14 indicate the respective wires of a three wire system and 15 diagrammatically represent lamps in a lighting installation, in connection with which my switch finds useful employment. The neutral wire 13 is a through uninterrupted connection via the conductor strip 16 which is mounted upon the base piece 4. Binding posts 17 and 18 are provided for conveniently wiring the outside leads or wires. This neutral conductor is a permanently grounded connection, and to effect this ground, a wire 19 is employed, one end of which is connected to the strip 16 by the binding nut or screw 18, and the opposite ends to the frame, or body portion of the receptacle at 20. A suitable wire-receiving terminal 21 is electrically connected with the receptacle, preferably fastened thereto by means of the connection 20 and is provided for the accommodation of the wire 22 which leads to the ground. This ground connection is preferably equal in size to the largest wire in the installation.

Two single pole switches, one on each side of the system, are provided with independently operable handles 23. These are rotatably mounted in the sides of the casing at 24 and may conveniently comprise U-shaped operating cranks made of bar or rod metal bent into the form shown. The inner free ends 24 of the handles are operably connected to the knife-blade contacts at 25. Upwardly-extending insulating ear pieces 26 are rigidly fastened to the knife-blade contacts 5 and are provided with slots 27 in which the free ends 24 of the operating cranks are positioned and operate when the handles of the switches are moved to make or break the connection between the contacts, as shown.

It will, therefore be apparent that I have provided switches with appurtenances which are well adapted for the purpose designed. One may manipulate either the upper or the lower switch, thereby controlling the respective load connected thereto without interfering with the other side. When one of these single pole switches is opened its entire connected load comes to ground potential and is, therefore, safe for workmen to alter or repair. In the embodiment shown the service is "ironclad" throughout.

I do not wish to be restricted to the precise details of construction shown and described, but reserve to myself a fair range of equivalents commensurate with the scope of the invention as defined by the following claims and the prior state of the art.

Having thus described my invention, what I claim as new herein and desire to secure by Letters Patent is:—

1. In a switch of the character described, a metallic housing provided with a cover, circuit controlling instrumentalities mounted within said housing, but insulated therefrom, said instrumentalities including a neutral wire connection grounded to the casing and a pair of single pole switches mounted in the casing and independently operable from the exterior thereof.

2. In a switch of the character described, a metallic housing provided with a cover, circuit controlling instrumentalities mounted within said housing, but insulated therefrom, said instrumentalities including an uninterrupted grounded connection for one of the wires of a three wire system and two single pole switches mounted independently in the casing, each of said switches controlling one of the remaining wires of the system and being provided with operating handles exterior of the casing for their manipulation.

3. A switch of the character described, including a metallic casing provided with a hinged cover, an insulating base mounted therein, a conductive strip mounted upon the base and adaptable for electrical connection with the neutral wire of a three wire system, a ground connection connected with said conductive strip at one end and to the casing at the other end, a pair of pivotally mounted knife-blade contacts mounted upon the base and a pair of coöperating stationary contacts mounted upon the base, means for connecting said contacts with the two remaining wires of the three wire system, operating handles journaled in the casing and having operable connection with the movable knife-blade contacts, substantially as described.

4. In a device of the character decsribed, a casing, an insulating block mounted within said casing, said block supporting a plurality of single pole single throw switches, associated with fuses and a through connector, means to ground said through connector to the casing, apertures in said casing corresponding in number to the switches, and an operating means individual to each switch passed through said apertures.

In witness whereof I have hereunto set my hand in the presence of two subscribing witnesses.

BRYSON DEXTER HORTON.

Witnesses:
HARRY S. FREEMAN,
IGNATIUS W. KAHN.

Copies of this patent may be obtained for five cents each, by addressing the "Commissioner of Patents, Washington, D. C."